Oct. 13, 1942.　　C. A. FOURNESS ET AL　　2,298,531
CREPED WADDING REEXPANDERS
Filed March 30, 1939　　6 Sheets-Sheet 1
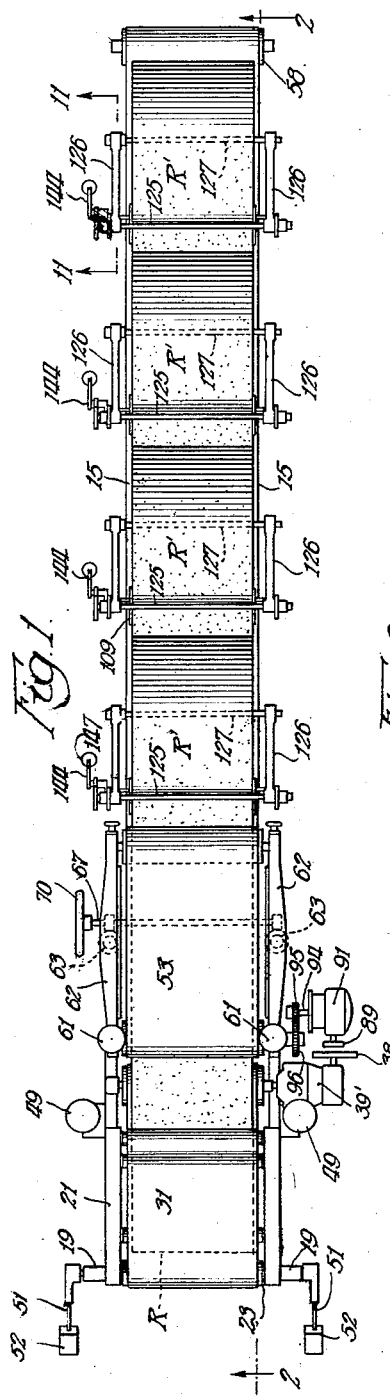
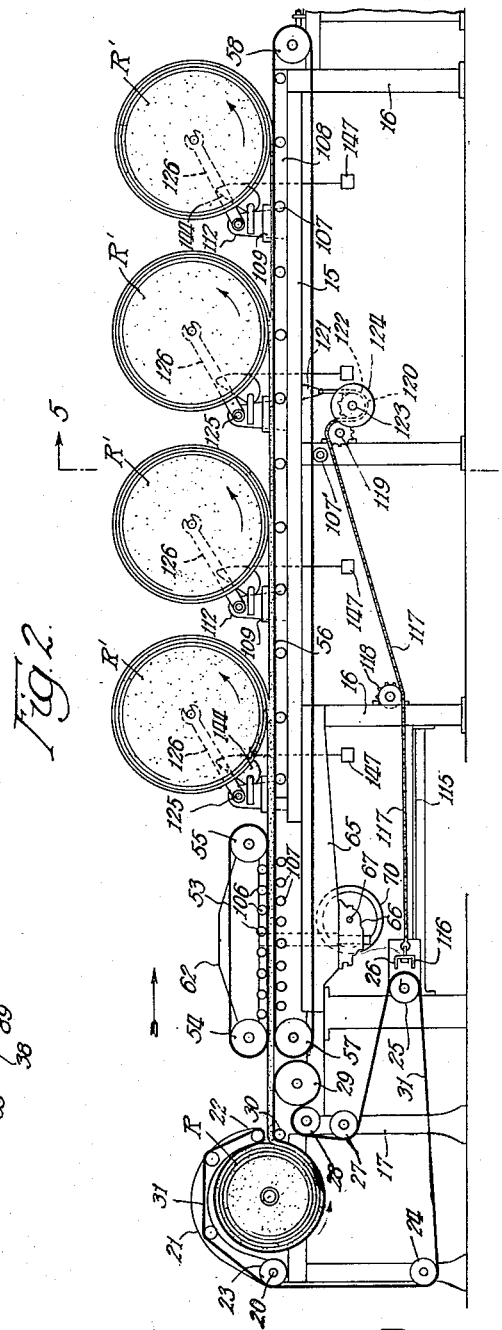
Inventors:
Charles A. Fourness.
Rudolph A. Moravek
By Fisher, Clapp, Soans & Pond Attys

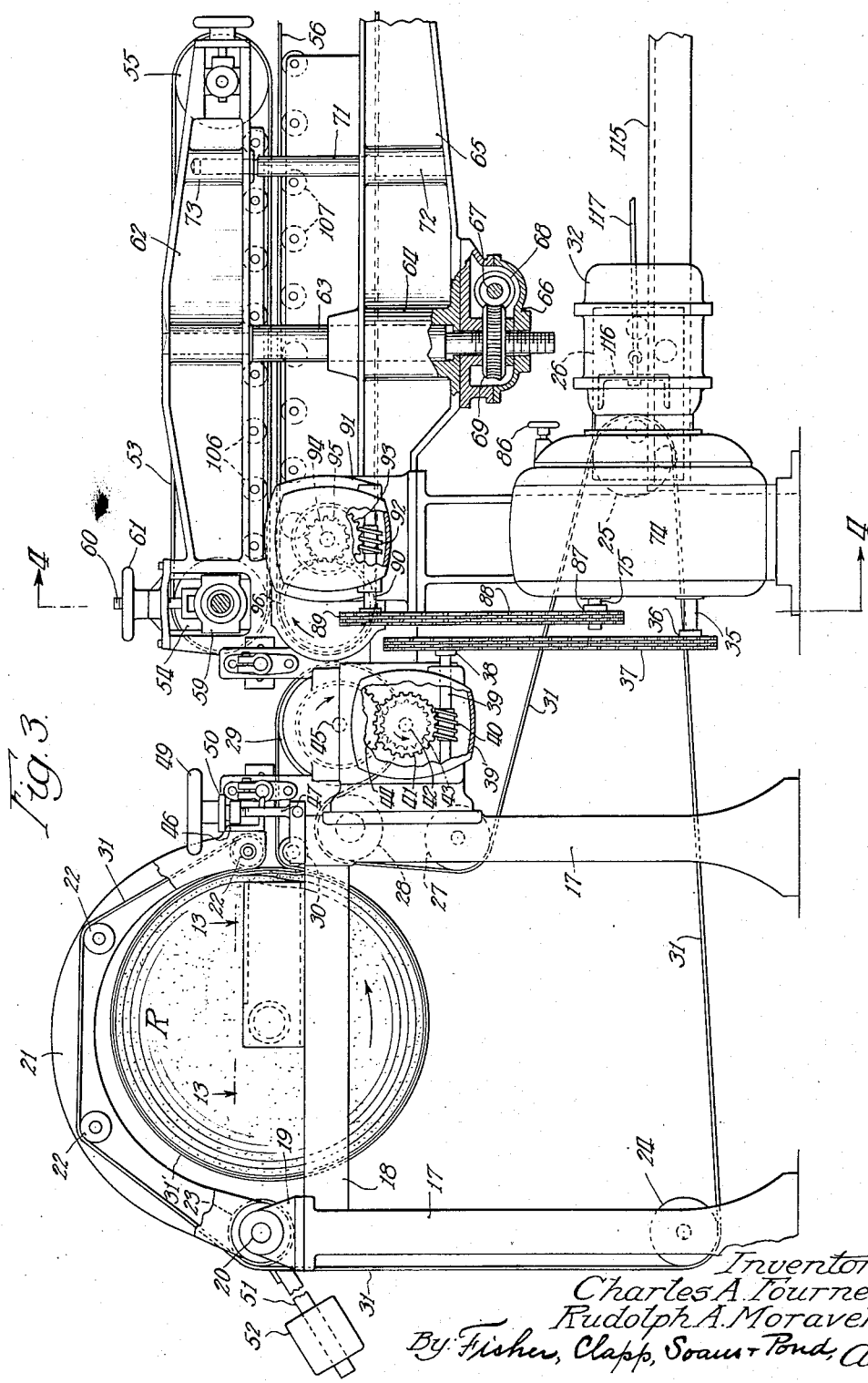

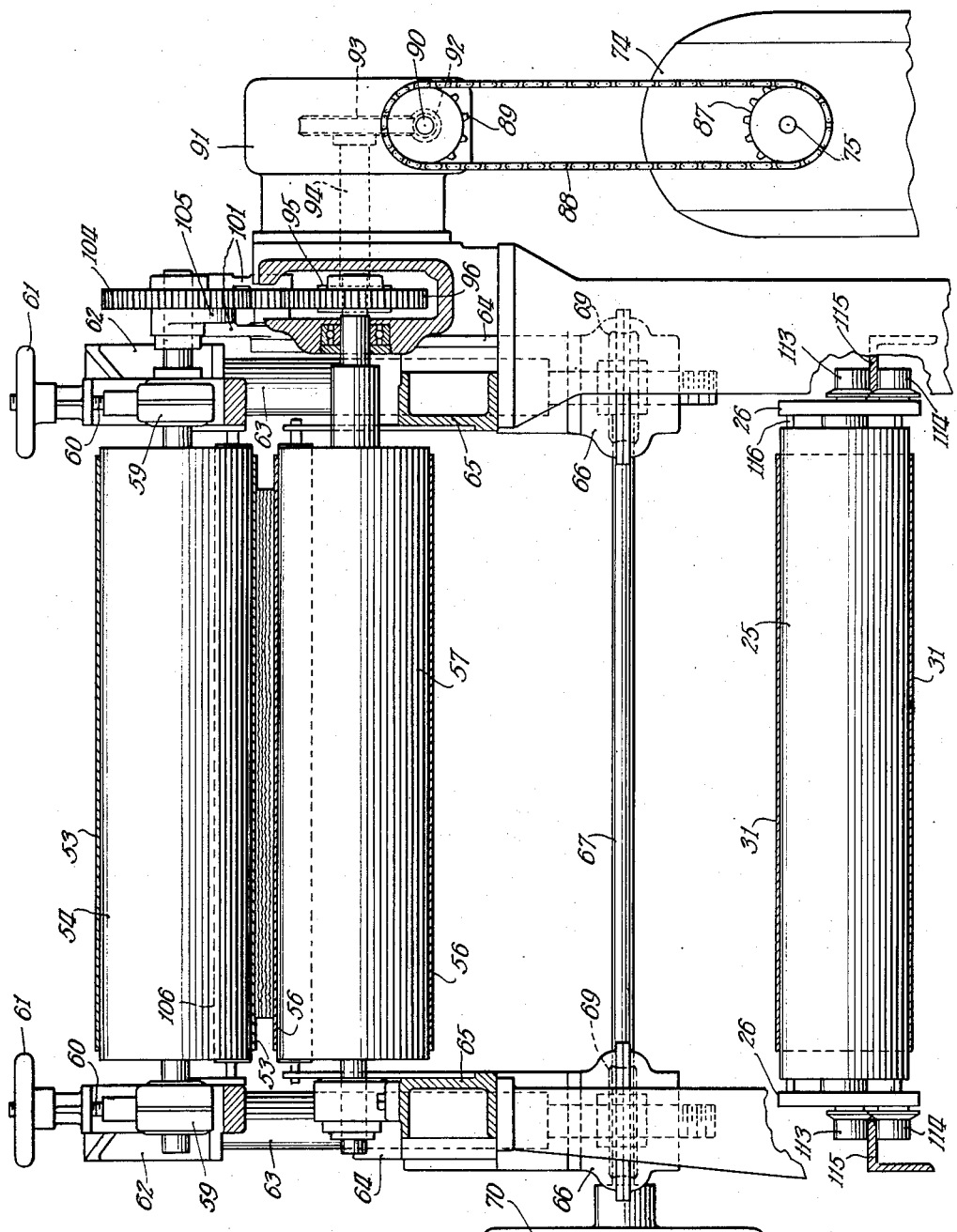

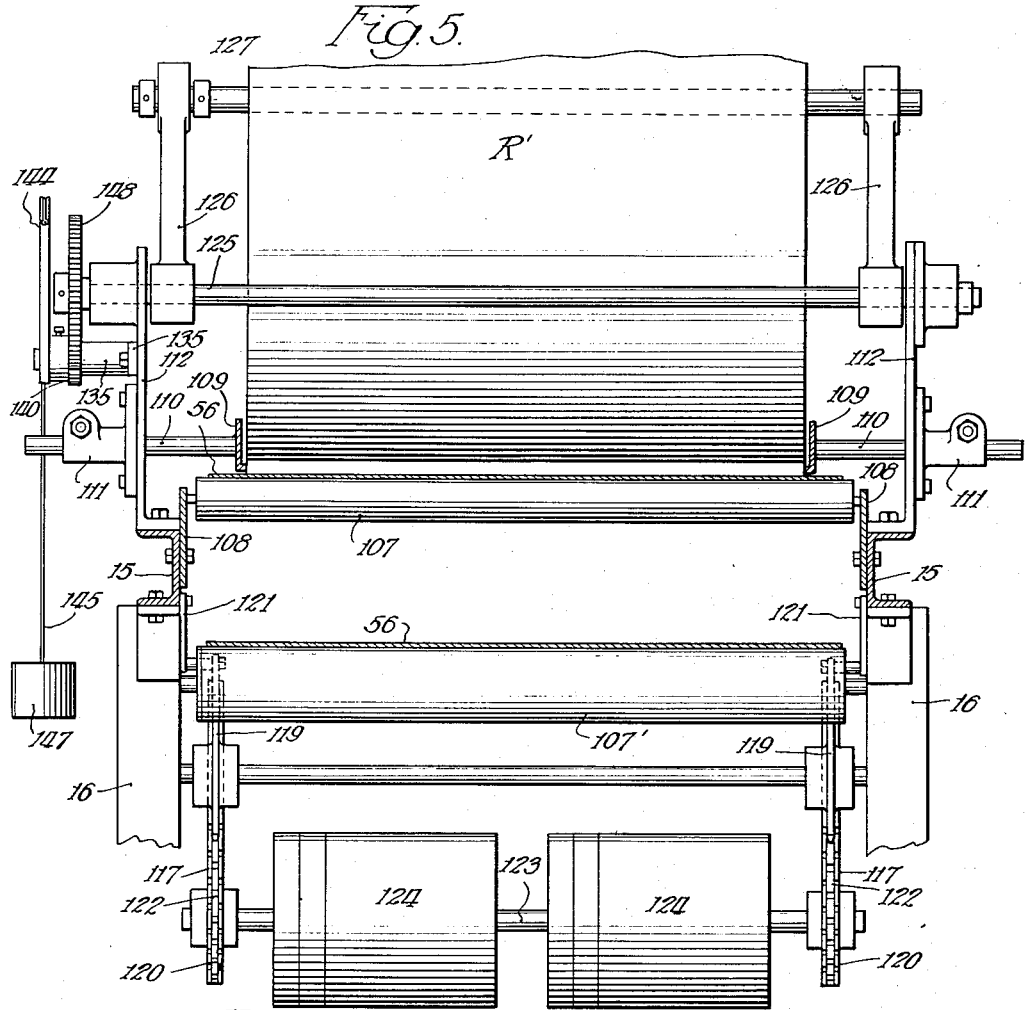
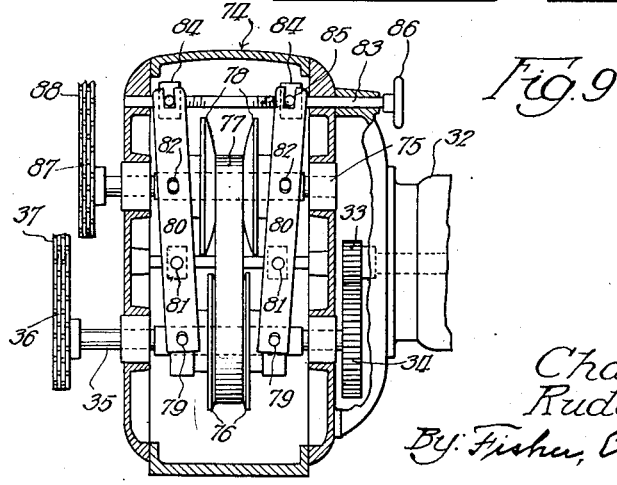

Inventors:
Charles A. Fourness,
Rudolph A. Moravek
By Fisher, Clapp, Soans & Pond, Attys.

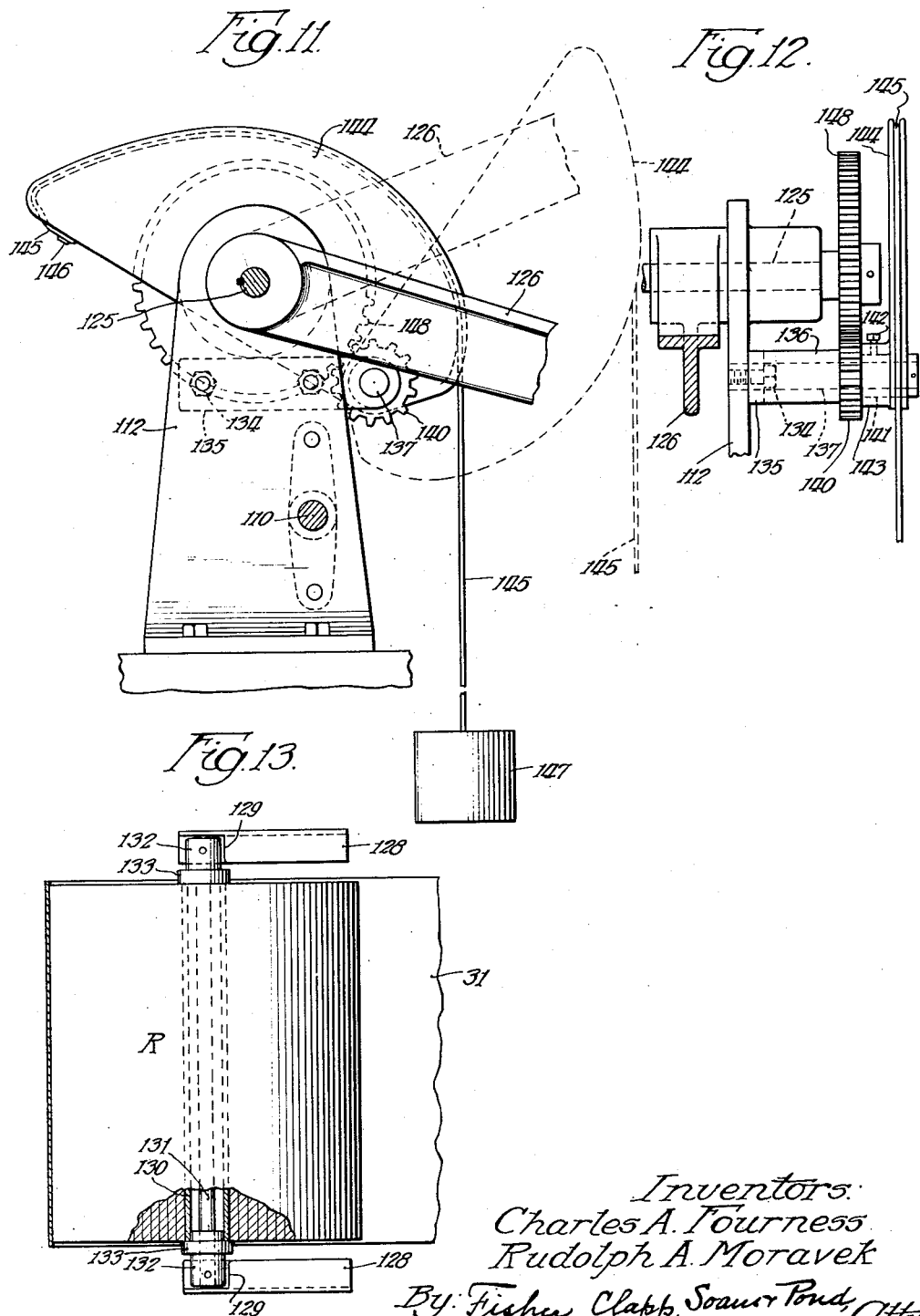

Patented Oct. 13, 1942

2,298,531

UNITED STATES PATENT OFFICE 2,298,531

CREPED WADDING REEXPANDERS

Charles A. Fourness, Appleton, and Rudolf A. Moravek, Neenah, Wis., assignors to Paper Patents Company, Neenah, Wis., a corporation of Wisconsin Application March 30, 1939, Serial No. 264,906

4 Claims. (Cl. 154—1)

In the manufacture of various products such as sanitary napkins, wall insulation, etc., from creped tissue wadding, in order to reduce the space required for storage and shipment it has heretofore been known to convert sheets or bats each containing one or more plies of superposed creped sheets from articles of low density and high bulk to articles of high density and low bulk by compressing such sheets or bats endwise to a small fraction of their original length while maintaining their thickness substantially constant or but slightly increased. An apparatus for effecting such compression and reduction of size, which in practice has been found very efficient, forms the subject matter of an application of Richard Neller, Serial No. 247,561, filed December 24, 1938, and owned by the assignee of the present application. It has also been found that for purposes of storage, shipment and preservation of the product in its compressed and condensed condition the roll form of such product is better suited than the flat form; and in our pending application Serial No. 256,242, filed February 13, 1939, now matured into Patent No. 2,270,043, dated January 13, 1942, also owned by the assignee of the present application, we have disclosed and claimed a compressed wadding roll and an apparatus for winding the compressed sheet or bat into roll form while maintaining its compressed and condensed condition.

The subject matter of the present application constitutes what might be termed the third and last member of a trinity of machines originated and designed in the offices and shops of our assignee to successively operate on the creped wadding between its place of manufacture and its place of final use; the subject-matter of the aforesaid Neller application, Serial No. 247,561 being the first, and the subject matter of our aforesaid application, Serial No. 256,242 being the second. However, so far as the function of the present invention is concerned, it is immaterial how or by what means the original sheets or bats are compressed and condensed endwise, and how or by what means the compressed and condensed sheets or bats are converted into roll form.

The general purpose or object of the present invention is to re-expand previously compressed wadding in such a way that the final product will have very uniform characteristics throughout its entire length. Manifestly, if the compressed wadding be re-expanded by manual stretching, it is next to impossible to obtain a product of uniform density throughout. In making sanitary napkins and other similar products it is important that the wadding reassume its characteristics of high bulk, low density, and uniform texture and weight. The same is true in the case of wall insulation, for which these creped wadding sheets or bats are extensively used.

The primary features of the present invention in its preferred form consist of (1) a cradle unwinder in which the roll of compressed wadding is placed, the unwinding of the roll being effected by an endless belt traveling at a uniform linear speed in contact with the surface of the roll, (2) a pair (upper and lower) of conveyor belts which grip the wadding and withdraw it from the unwinder without compacting it, and (3) a power transmission device that drives the conveyor at a higher linear speed than the endless belt of the unwinder, so that the wadding is stretched and re-expanded between the outlet of the unwinder and the receiving end or nip of the conveyor. Preferably the power transmission device is one of a known type providing a positive, infinitely variable transmission controlling the ratio between the speed of the conveyor belts and the speed of the cradle unwinder. Means may also be provided in association with an extension of the lower belt of the conveyor by which the sheet or pad of re-expanded wadding may be re-wound into a roll of uncompressed wadding, or a thick sheet or pad consisting of a plurality of plies may be divided and each division or ply rewound into an independent roll.

An illustrative embodiment of the invention, including a rewinder for the plies of a multiple-ply re-expanded pad, is shown in the accompanying drawings, in which—

Fig. 1 is a diagrammatic top plan view of the complete apparatus.

Fig. 2 is a diagrammatic longitudinal vertical section taken on line 2—2 of Fig. 1.

Fig. 3 is an enlarged view in side elevation, partly in vertical section, of the cradle unwinder and the conveyor which cooperates with the unwinder.

Fig. 4 is a vertical transverse section taken on line 4—4 of Fig. 3.

Fig. 5 is a vertical transverse section taken on line 5—5 of Fig. 2, broken off at top and bottom.

Fig. 9 is a vertical section through a simple form of variable transmission unit that operates the unwinder and conveyor at differential speeds.

Fig. 10 is a fragmentary side elevation, showing the manner of dividing an expanded sheet of multiple ply wadding into a plurality of sheets of lesser ply and thickness.

Fig. 11 is an elevation on an enlarged scale of a cam and weight device for counter balancing the weight of the roll of re-expanded wadding, viewed on the line 11—11 of Fig. 1.

Fig. 12 is a view of the parts shown in Fig. 11 as seen from the right of the latter.

Fig. 13 is an enlarged top plan of one of a pair of side guides for the roll of compressed wadding in the cradle unwinder.

Figure 6:
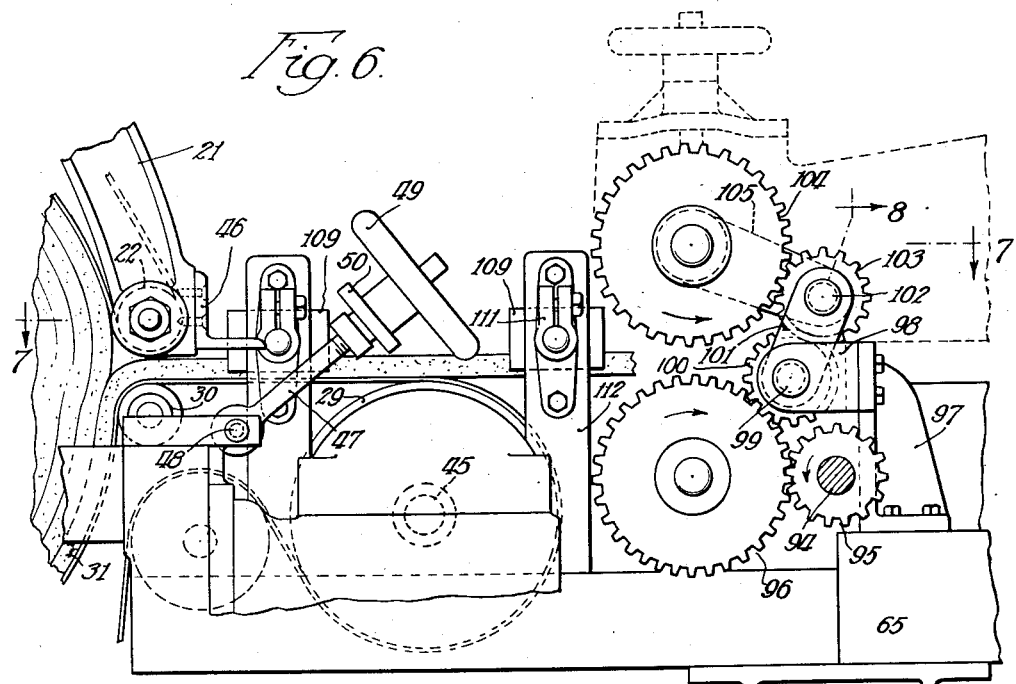
Fig. 6 is a side elevation of parts between the unwinder and the conveyor.

Referring to the drawings, the main supporting frame-work comprises mainly a pair of vertical side frame members each comprising a horizontal channel 15 and vertical supporting legs 16 therefor. This frame supports the belt conveyor of the apparatus. At the left end viewing Figs. 1, 2 and 3 is an auxiliary frame structure comprising uprights 17 and horizontal connecting bars 18 for a cradle unwinder. Journaled in brackets 19 mounted on end uprights 17 is rock shaft 20 fast on which are a pair of curved arms 21 carrying rollers 22.

Trained over the rollers 22, a roller 23 on the rock shaft 20, a roller 24 journaled between the lower portions of the end uprights 17, a tension roller 25 journaled in a slidable carriage 26 (Fig. 2), guide rollers 27 and 28, and a power driven roller 29 (Fig. 3) and a guide roller 30 that faces the roller 22 at the throat of the unwinder, is an endless belt 31. A loop 31' of this belt lies inwardly or rearwardly of the throat of the winder and encircles the roll R of previously compressed wadding which is to be unwound and reexpanded.

Describing the drive of the belt 31, and referring to Figs. 3 and 9, 32 designates an electric motor which, through a speed reducing pinion and gear 33 and 34, drives a shaft 35 of a variable speed transmission mechanism later described, and on shaft 35 is a sprocket 36 which, through a chain 37 drives a sprocket 38 fast on a horizontal shaft 39 journaled in a gear housing 39' attached to the side frame, said shaft carrying a worm 40 driving a worm wheel 41 fast on a counter shaft 42. Also fast on shaft 42 is a pinion 43 that drives a gear 44 fast on a shaft 45 on which is keyed the belt driving pulley 29. Belt 31 is thus driven at a uniform speed from the motor 32, the loop 31' which is in surface contact with the roll R turning in a counter-clockwise direction viewing Fig. 3.

The free ends of the pivoted arms 21 are connected by an angle bar 46 (Figs. 6 and 7), and to lock the arms 21 in working position we provide on each side a threaded locking rod 47 pivoted at 48 to a bracket on the side frame, and equipped with a hand wheel 49 fast with which is an annular shoulder 50 adapted to overlie the top edge of the angle bar 46, as shown in Fig. 3. Fig. 6 shows a disengaged position of this lock. On the ends of the rock shaft 20 are arms 51 carrying counterweights 52 to facilitate the back swing of the arms 21 when a new roll is to be inserted.

Beyond the unwinder is a belt conveyor the main function of which is to stretch and expand the previously compressed wadding as it comes from the unwinder. This conveyor comprises an upper belt 53 mounted on drum rollers 54 and 55, and a lower longer belt 56 (see Fig. 2) mounted on drum rollers 57 and 58. The adjacent laps of the two belts are spaced slightly less than the thickness of the wadding to give them an adequate frictional grip on the latter; and, to maintain them in substantial parallelism, the journal bearing blocks 59 are adjustable vertically by threaded rods 60 and nuts 61 on said rods, as shown in Figs. 3 and 4.

In order to accommodate the conveyor to wadding sheets or pads of varying thickness the upper member of the conveyor is bodily adjustable vertically toward and from the lower member. Referring to Figs. 3 and 4, the belt rollers 54 and 55 are journaled in and between the ends of a pair of parallel beams 62, each of which is centrally mounted on a vertical shaft 63 supported in a bearing sleeve 64 cast on an auxiliary frame bar 65 attached to the main side frame. The lower end of shaft 63 is reduced and threaded and extends through a gear casing 66 attached to the lower side of bar 65. The two shafts 63 are raised and lowered equally by a cross shaft 67, worms 68 on said cross shaft, worm gears 69 threaded on shafts 63 and confined laterally in gear casings 66, and a hand wheel 70 on one end of cross shaft 67. A post 71 mounted in a socket 72 on the bar 65 and at its upper end slidably engaged with a socket 73 on the beam 62 prevents any side play of beam 62, and maintains the two beams always in strict parallelism.

Figure 7:
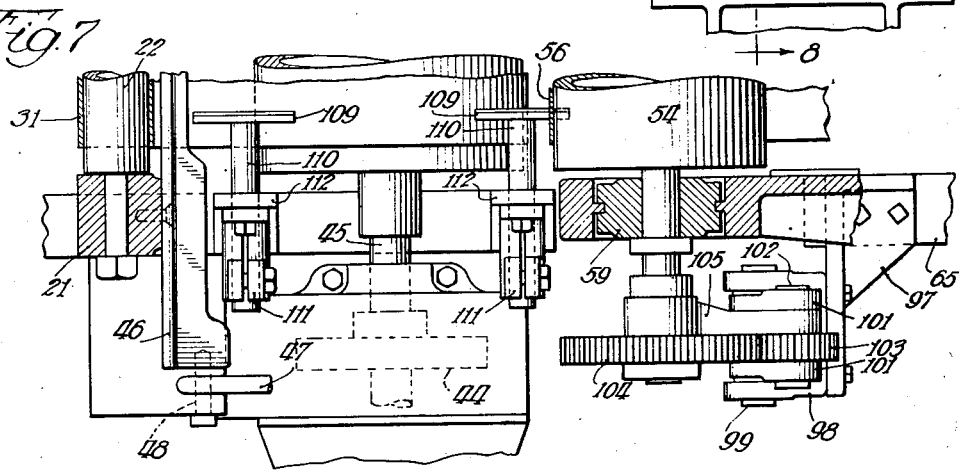
Fig. 7 is a plan section taken on the line 7—7 of Fig. 6.
Figure 8:
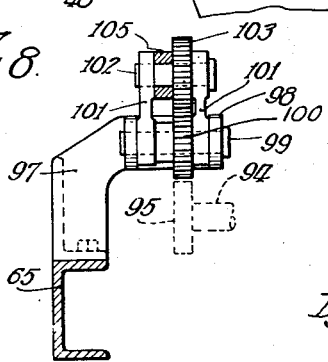
Fig. 8 is a fragmentary vertical section through an adjustable transmission from the lower to the upper roll of the conveyor, taken on line 8—8 of Fig. 6.

The belt conveyor is driven at an increased speed over that of the unwinder belt 31 from the motor 32 by the following mechanism. The variable speed transmission unit, designated as an entirety by 74, includes a shaft 75 parallel with the shaft 35. Splined on the shaft 35 are a pair of cone pulleys 76 which, through a link belt 77, drive a similar pair of cone pulleys 78 splined on the shaft 75. The hubs of the pulleys 76 are pivotally connected at 79 to one end of a pair of levers 80 that can swing on fixed pivots 81, and on the other side of said pivots the levers 80 are similarly pivoted at 82 to the hubs of the cone pulleys 78. In one end of the casing is journaled a shaft 83 having oppositely threaded portions which operate blocks 84, these latter carrying pins 85 engaged with slotted ends of the levers 80. On one end of the shaft 83 is a hand wheel 86, by turning which the levers 80 can be swung so as to shift the cone pulleys 78 toward each other and simultaneously shift the cone pulleys 76 from each other, or vice versa, thus varying the speed of the shaft 75 relatively to that of the shaft 35. This variable speed transmission unit is a known commercial article and no claim per se thereto is made. Fast on the shaft 75 is a sprocket 87 which, through a chain 88 drives a sprocket 89 fast on a shaft 90 journaled in a gear casing 91 attached to the adjacent side frame of the machine. On shaft 90 is a worm 92 that drives a worm wheel 93 fast on a shaft 94. Fast on the other end of shaft 94 is a pinion 95 meshing with and driving a gear 96 (Fig. 6) fast on the shaft of the lower drum roller 57. By this mechanism the lower belt 56 of the conveyor is operated. Drum roller 54 of the upper belt 53 is operated from the drive of the lower belt by a mechanism that permits vertical adjustment of the upper belt and its rollers toward and from the lower belt without interrupting the transmission. This mechanism, which is substantially identical with a similar mechanism disclosed in the aforesaid Neller application, consists of the following. Referring to Figs. 6, 7 and 8, mounted on the frame bar 65 is an angle bracket 97, to one side of which is attached a horizontal U-shaped bracket 98, in and between the sides of which is a short shaft 99. On shaft 99 is a gear 100 that meshes with and is driven by the gear 96 (Fig. 6). Pivoted on shaft 99 are a pair of parallel upwardly extending links 101 in and between the upper ends of which is a short shaft 102 on which is mounted a gear 103 that is driven by the gear 100 and itself drives a gear 104 fast on the shaft of the upper drum roller 54. A link 105 pivoted at its ends on the shaft of roller 54 and on the link shaft 102 maintains the gear 103 constantly in mesh with the gear 104. The gears of this transmission are of such sizes as to transmit to the upper belt of the conveyor a traveling movement at exactly the same speed as that of the lower belt. This last described flexible drive for the upper belt 53 is omitted from Fig. 3 for the sake of clearness.

The lower lap of the upper conveyor belt 53 and the upper lap of the lower conveyor belt 56 are backed by rows of supporting rolls 106 and 107 respectively, one of the latter appearing in side elevation in Fig. 5. The end pintles of these rolls are journaled in vertical plates 108 attached to the side frame channels 15. The purpose of these supporting rolls is to maintain the wadding-engaging laps of the belt flat. Similar belt-backing rolls are shown and described in the aforesaid Neller application.

Suitable guides for the side edges of the pads to prevent any edgewise displacement of the latter while traveling through and beyond the pad-stretching conveyor are provided. These guides, which also follow the structure of similar devices disclosed in the aforesaid Neller application, may take the form of bars 109 mounted on the inner ends of rods 110 adjustably mounted (to serve pads of different widths) in clamps 111 attached to vertical brackets 112 mounted on the side frames.

Describing the means herein shown for tensioning the unwinder belt 31, and referring to Figs. 2, 3, 4 and 5, the carriage 26 which carries the tensioning roll 25, is equipped on each end thereof with rollers 113 and 114 straddling the horizontal limb of an angle bar track trail 115. The two end members of the carriage are connected and spaced by a channel bar 116 (Fig. 2), to the ends of which are attached a pair of sprocket chains 117. Each chain extends under a guide sprocket 118 mounted on one of the frame uprights 16, thence over another guide sprocket 119 mounted on another frame upright 16, from which latter sprocket it hangs in the form of a loop 120 which is created by attaching the end of the chain to the side frame, as shown at 121 in Fig. 5. Seated in the two loops 120 are sprockets 122 that are mounted on the ends of a rod 123, and suspended on rod 123 are a pair of weights 124. This construction allows the weights 124 to be readily exchanged for lighter or heavier weights, according to the amount of tension it is desired to apply to the belt 31. Of course, any other form of belt tensioning means adjustable or otherwise may be employed. A roll 107' (Fig. 5) underlies the lower lap of belt 56 to prevent interference of the latter with chains 117 and sprockets 119.

We have found it desirable to provide side guides for the roll R of compressed wadding in the cradle unwinder to prevent side play of the roll as it is being unwound, and one of these side guides is best illustrated in the enlarged plan view Fig. 13. Mounted on each of the side frames of the unwinder is an inwardly facing channel 128, in the top wall of which is an opening 129. The roll of compressed wadding comes from the cradle winder of the compressor with a hollow cardboard core 130 in the center. Before it is placed in the cradle unwinder of the re-expander, a steel core shaft 131 is inserted and locked in place by end sleeves 132 pinned or otherwise secured on the projecting ends of the shaft 131, these sleeves riding in the channels 128. Fast on each sleeve 132 is a collar 133 that bears against the end of the cardboard core 130. Since the ends of the core shaft 131 extend to the vertical walls of the channels, any side play of the roll R is prevented. Of course, a steel core shaft fitting the internal diameter of the cardboard shaft 130 might be used, in which case the end sleeves 132 could be omitted and the collars 133 applied directly to the steel core shaft to the same effect; but the construction shown enables the use of a much smaller and lighter steel core shaft.

The apparatus as thus far described is complete for producing flat re-expanded sheets or bats of creped wadding which are simply run out from the conveyor belts onto the lower belt extension, the latter serving as a receiving table or platform, from which the sheets or bats may be manually removed. For this purpose the lower belt extension might obviously be replaced by a stationary platform or table.

Since the re-expanded sheets or bats are not always used as fast as they come from the re-expander, it may be desirable to rewind them in roll form for storage until used. For this purpose we have herein disclosed a very simple form of rewinder which is especially useful where a thick pad or bat containing a plurality of plies is to be separated into its several plies. Referring to Figs. 1, 2 and 5, journaled at its ends in opposed brackets 112 is a shaft 125, and keyed on this shaft are a pair of arms 126, the free ends of which are slotted to receive a core rod 127 which, before the rewinding begins, lies on the belt 56. For purposes of illustration, we have assumed that the apparatus is to convert a thick pad or bat R containing say four plies of compressed wadding into four rewound rolls R' of re-expanded wadding each of a single ply. As the re-expanded wadding issues from the conveyor, the end of the top ply is curled around the core rod of the first rewinder, the end of the next ply is curled around the core rod of the second rewinder, and so on. Thus, as the wadding travels over the lower belt extension the several rewound rolls R' are built up, said rolls being rotated solely by the friction of the belt. This division of the original thick four ply bat or pad into four single-ply pads or bats is graphically illustrated in Fig. 10.

In the experimental work with this machine it has been found desirable to associate with the re-winding device a cam and weight system which counterbalances most of the weight of the roll R' of re-expanded wadding. The purpose of this is to prevent compacting of the coils and especially the outer coils due to the weight of the roll and its carrying arms; and the counterbalancing system has been so designed that the counterbalancing effect increases as the roll builds up substantially in proportion to the increase in the weight of the roll. A simple and practical form of such a counterbalancing system is best illustrated in Figs. 11 and 12; and referring thereto, attached to and crosswise of the outer side of the vertical bracket 112, as by machine screws 134, is a horizontal bracket comprising a flat arm 135 and a lateral bearing boss 136 welded or otherwise secured to the projecting end of said arm; and in this boss is keyed a shaft 137. Rotatable on shaft 137 is a pinion 140 and its hub 141, and having a press fit on hub 141 and locked to the latter by a set screw 142 is the hub 143 of a sector cam 144. The periphery of this cam is grooved to seat a cord 145 that is attached at 146 to the nose end of the cam, and on its lower depending end supports a weight 147. The pinion 140 meshes with a gear 148 that is keyed on the shaft 125 to which arms 126 are keyed. From this it will be seen that the weight 147 exerts a lifting effect on the arms 126 and the roll R', but this effect is slightly less at all times than the gravity effect of the roll R' and its carrying arms, so that the roll as it builds up remains in contact with its driving belt 56 but the bulk of the weight of the roll and its carrying arms is counterbalanced, and hence the coils on the roll do not become appreciably compacted. It will be noted that the shape of the cam 144 is such that, as the roll builds up and its weight increases, the radius of pull of the weight 147 increases correspondingly, so that the slight pressure of the roll on the belt 56 remains substantially constant during the entire rewinding operation.

The mode of operation has already been to a considerable extent described in connection with the description of the structural features, but may be briefly summarized as follows:

The rolls R of compressed wadding arrive at the converting plant wrapped in paper covers (as disclosed in our aforesaid application, Serial No. 256,242), or in boxes which prevent re-expansion. The cradle arms 21 being thrown back, an unopened roll R is supplied with the steel core shaft 131 and placed in the canvas cradle of the unwinder. The arms are then swung back to, and locked in, the closed position shown in the drawings, and the paper wrapping around the roll is slit and pulled out through the gap between the rollers 22 and 30 at the throat of the unwinder. Next, the end of the rolled up strip of compressed wadding is pulled through this gap and threaded between the receiving ends of the upper and lower belt conveyors, which constitute the fast section of the re-expander. The machine is then started in operation, and, since the belt conveyor travels at a greater linear speed than the belt 31 of the unwinder, the wadding in passing from the latter to the conveyor is stretched and re-expanded. For a given setting of the variable speed transmission device 74, which is determined by manipulation of the hand wheel 86, the speed ratio of the unwinder and conveyor remains constant, and, as a result, the expansion of the wadding is uniform; but the degree of stretching and re-expansion may be varied by turning the hand wheel 86 in one direction or the other. The re-expanded wadding is delivered from the belt conveyor onto the long extension of the lower belt, whence it may be manually removed if the re-expanded product is desired in flat form. Where the machine is equipped with one or more re-winders, the core shaft or shafts of the latter are lowered onto the belt 56, the end of the wadding, or the ends of a plurality of plies of the wadding, are then curled around the core shaft or shafts, and, as the operation continues the re-wound rolls R' are built up, and manually removed when completed.

We have found that when the initial roll R is placed in the canvas loop of the cradle unwinder, its own weight creates some tension on the belt 31, and very little tension on the latter is required to hold the roll in favorable unwinding position, so that but slight effort is required to draw the tension roll back when forming the loop in the belt to seat the roll. Since the roll R is unwound by the friction of the belt 31, the speed of which is constant, and since the wadding passing through the conveyor is also driven by the friction of the belts of the conveyor, the speed of which is also constant, the gradual diminution of the diameter of roll R makes no difference in the fixed speed ratio. Of course, the rotary speed of roll R increases as it is unwound, and the rotary speed of the re-wound roll R' decreases as it is wound up.

Changes in the details of structure and arrangement may be resorted to within the purview and coverage of the appended claims, without departing from the principle of the invention or sacrificing any of the advantages thereof.

We claim:

1. Apparatus for re-expanding a roll of previously endwise compressed creped wadding comprising, in combination, a cradle unwinder including an endless belt having a loop portion encircling and frictionally rotating said roll in an unwinding direction, means for driving said endless belt at a uniform speed, means for withdrawing said compressed wadding from said unwinder at a uniform speed greater than the speed of said endless belt, side guides in the form of inwardly facing channels on the cradle unwinder, a core shaft in the compressed wadding roll having projecting ends engaged with said channels, and the means for preventing lateral shift of said roll or said core shaft.

2. Apparatus for re-expanding a roll of previously endwise compressed creped wadding comprising, in combination, a cradle unwinder including an endless belt having a loop portion encircling and frictionally rotating said roll in an unwinding direction, means for driving said endless belt at a uniform speed, means for withdrawing said compressed wadding from said unwinder at a uniform speed greater than the speed of said endless belt, side guides in the form of inwardly facing channels on the cradle unwinder, a core shaft in the compressed wadding roll having projecting ends engaged with said channels, and collars fast on said core shaft engaged with the ends of said roll.

3. Apparatus for expanding a strip of creped wadding previously compressed endwise and packaged in the form of a roll, comprising a continuous endwise-movable belt, a support for said belt, the belt being arranged to extend around a substantial arc of the compressed roll, means for maintaining sufficient tension on said belt, substantially independent of the diameter of the roll, so as to prevent any substantial amount of slippage between the belt and the exterior of the roll, a draft device for drawing the strip from the roll, means for operating said draft device at a predetermined speed, and variable speed transmission means between said device operating means and said belt for limiting the speed of travel of said belt to a substantially fixed, predetermined fraction of the speed of the draft device.

4. An embodiment of the apparatus defined in claim 3, wherein the variable speed transmission means between the draft device operating means and the belt includes belt driving and driven pulleys and means for changing the effective diameters of said pulleys to thereby vary the relative speeds of the draft device and belt.

CHARLES A. FOURNESS.
RUDOLF A. MORAVEK.